United States Patent
Yamauchi et al.

(10) Patent No.: US 6,413,163 B1
(45) Date of Patent: Jul. 2, 2002

(54) VIDEO GAME MACHINE, METHOD FOR SWITCHING VIEWPOINT ON GAME SCREEN OF VIDEO GAME, AND COMPUTER-READABLE RECORDING MEDIUM CONTAINING GAME-SCREEN-VIEWPOINT SWITCHING PROGRAM

(75) Inventors: Madoka Yamauchi, Toyonaka; Katsuma Kashiwagi, Akashi; Tomoharu Okutani, Kyoto, all of (JP)

(73) Assignees: Konami Co., Ltd., Hyogo-ken; Kabushiki Kaisha Konami Computer Entertainment Osaka, Osaka-fu, both of (JP)

( * ) Notice: Subject to any disclaimer, the term of this patent is extended or adjusted under 35 U.S.C. 154(b) by 0 days.

(21) Appl. No.: 09/406,553

(22) Filed: Sep. 27, 1999

(30) Foreign Application Priority Data

Sep. 28, 1998 (JP) .......................... 10-273801

(51) Int. Cl.[7] ................................. A63F 13/00
(52) U.S. Cl. ........................... 463/31; 463/43
(58) Field of Search ................. 463/1, 30–34, 463/43; 345/7, 9, 418–419

(56) References Cited

U.S. PATENT DOCUMENTS

| | | | | |
|---|---|---|---|---|
| 5,616,079 A | * | 4/1997 | Iwase et al. | 463/32 |
| 5,734,807 A | * | 3/1998 | Sumi | 395/127 |
| 5,769,718 A | * | 6/1998 | Rieder | 463/31 |
| 5,830,066 A | * | 11/1998 | Goden et al. | 463/33 |
| 6,139,433 A | * | 10/2000 | Miyamoto et al. | 463/32 |
| 6,183,363 B1 | * | 2/2001 | Ishihara et al. | 463/31 |
| 6,231,440 B1 | * | 5/2001 | Yamashita | 463/7 |
| 6,231,443 B1 | * | 5/2001 | Asai et al. | 463/32 |

FOREIGN PATENT DOCUMENTS

| | | |
|---|---|---|
| EP | 0797173 | 9/1997 |
| EP | 0841640 | 5/1998 |
| JP | 10113467 | 5/1998 |
| JP | WO9839738 | 9/1998 |
| JP | 10-273801 | 5/1999 |

OTHER PUBLICATIONS

"Jugemu"; published by Recruit–sha, Japan, Sep. 1, 1998, vol. 9, pp. 59–61 (English Translation of Japanese Office Action Using Jugemu as Basis for Claim Rejections).

G. Wilcox: "Goemon's Great Adventure" 'Online!, May 11, 1999, pp. 1–3, XP002139292 Retrieved from the Internet: <URL.www.gametour.com/reviews/NIN/goemon.shtml> 'retrieved on May 5, 2000! * page 2, paragraph 3—page 3, paragraph 1*.

* cited by examiner

*Primary Examiner*—Valencia Martin-Wallace
*Assistant Examiner*—Scott E. Jones
(74) *Attorney, Agent, or Firm*—Jordan and Hamburg LLP

(57) ABSTRACT

A video game machine includes a plurality of operation units corresponding to a plurality of leading characters appearing in a virtual three-dimensional space, a game-screen display unit, a coordinate storage unit for storing pairs of coordinates set so as to be related to the leading characters, a game-screen display-control unit for displaying, on the game-screen display unit, a game screen obtained by using, as a viewpoint, any one of the pairs of coordinates, an operation determination unit for determining whether a viewpoint-switching operation has been implemented among operations using one operation unit for moving one leading character related to the pair of coordinates of the viewpoint in the game screen displayed on the game-screen display unit, and a viewpoint-switching-display control unit for initiating a viewpoint-switching movement of switching the pair of coordinates of the viewpoint to another pair of coordinates when the operation determination unit has determined that the viewpoint-switching operation has been implemented.

26 Claims, 11 Drawing Sheets

VIDEO GAME MACHINE, METHOD FOR SWITCHING VIEWPOINT ON GAME SCREEN OF VIDEO GAME, AND COMPUTER-READABLE RECORDING MEDIUM CONTAINING GAME-SCREEN-VIEWPOINT SWITCHING PROGRAM

BACKGROUND OF THE INVENTION

1. Field of the Invention

The present invention relates to video game machines using a recording medium such as an optical disk, a magnetic disk, or a semiconductor memory in which program data are recorded, methods for switching a viewpoint on a game screen of a video game, and recording media containing a program for switching the viewpoint on the game screen of the video game.

2. Description of the Related Art

Many game systems have been proposed, such as a system comprised of a home-use game console and a television monitor, a commercial-use game machine, and a system comprised of a personal computer or work station, a display, and a sound output device.

The game systems each include a player-operated controller, a recording medium containing game-program data, a central processing unit (CPU) for performing control for the generation of sound and images based on the game-program data, a processor for generating images, a processor for generating sound, a monitor for displaying images, and a speaker for outputting the generated sound. In many cases, the types of recording medium include a compact-disk readonly memory (CD-ROM), a semiconductor memory, and a cassette having a built-in semiconductor memory.

In the game systems, a model or character as each object displayed on the monitor is, in general, three-dimensional formed by a plurality of polygons that are two-dimensional virtual triangles or quadrangles. By pasting textures as two-dimensional-image data on the polygons, the model or character is displayed as a three-dimensional image.

In the game systems, the number of viewpoints used when a game screen including three-dimensional images is displayed on the monitor is normally set to one. In the case where the monitor screen is divided into portions for displaying a plurality of game screens, while using a plurality of viewpoints, the size of each game screen is reduced. This reduction in the game screen reduces the dynamism of the game. The use of one viewpoint prevents this problem from occurring.

Conventional video games are known in which a plurality of leading characters appear and are designed to be operated by corresponding players.

Also in these video games in which the leading characters appear, the number of viewpoints is set to one. Thus, it is difficult for each player to appropriately grasp the relationship between each operation status and the corresponding leading character.

SUMMARY OF THE INVENTION

Accordingly, the present invention has been made in view of the foregoing circumstances. It is an object of the present invention to provide a video game machine in which viewpoints used when a game screen is displayed on a monitor are set so as to correspond to a plurality of leading characters and the viewpoint is switched from one to another, a method for switching a viewpoint on a game screen of a video game, and a computer-readable recording medium containing a program for switching a viewpoint on a game screen.

To this end, according to an aspect of the present invention, the foregoing object is achieved through provision of a video game machine including: a plurality of operation units, which correspond to a plurality of leading characters appearing in a virtual three-dimensional space, causing the corresponding leading characters to move; a game-screen display unit; a coordinate storage unit for storing pairs of coordinates set so as to be related to the leading characters; a game-screen display-control unit for displaying, on the game-screen display unit, a game screen obtained by using, as a viewpoint, any one of the pairs of coordinates; an operation determination unit for determining whether a viewpoint-switching operation has been implemented among operations using one operation unit for moving one leading character related to the pair of coordinates of the viewpoint in the game screen displayed on the game-screen display unit; and a viewpoint-switching-display control unit for initiating a viewpoint-switching movement of switching the pair of coordinates of the viewpoint to another pair of coordinates when the operation determination unit has determined that the viewpoint-switching operation has been implemented.

Preferably, when the operation determination unit has determined that the viewpoint-switching operation has been implemented, the viewpoint-switching-display control unit displays, on the game-screen display unit, a viewpoint-switching item as the viewpoint-switching movement.

The video game machine may further include a prohibition-control unit in which while the viewpoint-switching item is being displayed, the prohibition-control unit prohibits the operation determination unit from determining whether the viewpoint-switching operation has been implemented.

The operation determination unit may determine one leading character specified by the viewpoint-switching operation from among the other leading characters displayed on the game-screen display unit.

The operation determination unit may further determine whether a viewpoint-switching rejecting operation has been implemented among operations using one operation unit corresponding to the specified leading character. When the operation determination unit has determined that the viewpoint-switching rejecting operation has been implemented, the viewpoint-switching-display control unit may interrupt the viewpoint-switching movement and may terminate the display of the viewpoint-switching item, while when the operation determination unit has determined that no viewpoint-switching rejecting operation has been implemented, the viewpoint-switching-display control unit may switch the pair of coordinates of the viewpoint to a pair of coordinates set so as to be related to another leading character, and may terminate the display of the viewpoint-switching item.

The viewpoint-switching-display control unit may move the viewpoint-switching item being displayed toward the specified leading character, and when the operation unit corresponding to the specified leading character is operated for attacking or avoiding the viewpoint-switching item, the operation determination unit may determine that the viewpoint-switching rejecting operation has been implemented.

The viewpoint-switching-display control unit may move the viewpoint-switching item being displayed toward the specified leading character, and when the operation unit corresponding to the specified leading character is not operated for attacking or avoiding the viewpoint-switching item, and the viewpoint-switching item reaches a predetermined range including the specified leading character, the operation determination unit may determine that the viewpoint-switching rejecting operation has not been implemented.

The viewpoint-switching-display control unit may move the viewpoint-switching item being displayed toward the specified leading character, and when the operation unit corresponding to the specified leading character is not operated for attacking or avoiding the viewpoint-switching item, and the viewpoint-switching item reaches a predetermined range including the specified leading character, the operation determination unit may determine that the viewpoint-switching rejecting operation has not been implemented.

According to another aspect of the present invention, the foregoing object is achieved through provision of a method for switching a game-screen viewpoint used in a video game displaying, on a game-screen display unit, a game screen on which a plurality of leading characters appearing in a virtual three-dimensional space are moved by using operation units corresponding to the leading characters and on which any one of a plurality of pairs of coordinates related to the leading characters is used as a viewpoint. The method includes the steps of determining whether a viewpoint-switching operation has been implemented by using one of the operation unit so that one of the leading characters which is related to the pair of coordinates of the viewpoint for the game screen displayed on the game-screen display unit, and initiating a viewpoint-switching movement for switching the pair of coordinates of the viewpoint to another pair among the pairs of coordinates when it is determined that the viewpoint-switching operation has been implemented.

According to a further aspect of the present invention, the foregoing object is achieved through provision of a computer-readable recording medium containing a game-screen-viewpoint switching program for a video game displaying, on a game-screen display unit, a game screen on which a plurality of leading characters appearing in a virtual three-dimensional space are moved by operation units corresponding to the leading characters and on which any one of a plurality of pairs of coordinates related to the leading characters is used as a viewpoint. The game-screen-viewpoint switching program includes a determination step for determining whether a viewpoint-switching operation has been implemented by using one of the operation unit so that one of the leading characters which is related to the pair of coordinates of the viewpoint for the game screen displayed on the game-screen display unit, and a viewpoint-switching-movement initiating step for initiating a viewpoint-switching movement for switching the pair of coordinates of the viewpoint to another pair among the pairs of coordinates when it is determined that the viewpoint-switching operation has been implemented.

According to the present invention, each player operating the operation unit corresponding to each leading character can clearly grasp the relationship between each operation status and the movement of the leading character. A viewpoint-switching movement, which is being performed, can be clearly displayed for the player operating each leading character. A viewpoint for a game screen displayed on a game-screen display unit can be preferably switched among pairs of coordinates set to be related to leading characters. Viewpoint switching can be securely performed. The player, operating each operation unit corresponding to a specified leading character, can select acceptance or rejection of viewpoint switching, which enhances the enjoyment of the game. A viewpoint-switching rejecting operation can be clearly indicated. No implementation of a viewpoint-switching rejecting operation can be clearly indicated. The execution of viewpoint switching can be clearly indicated, which can express the dynamism of viewpoint switching.

DESCRIPTION OF THE PREFERRED EMBODIMENTS

Figure 1:
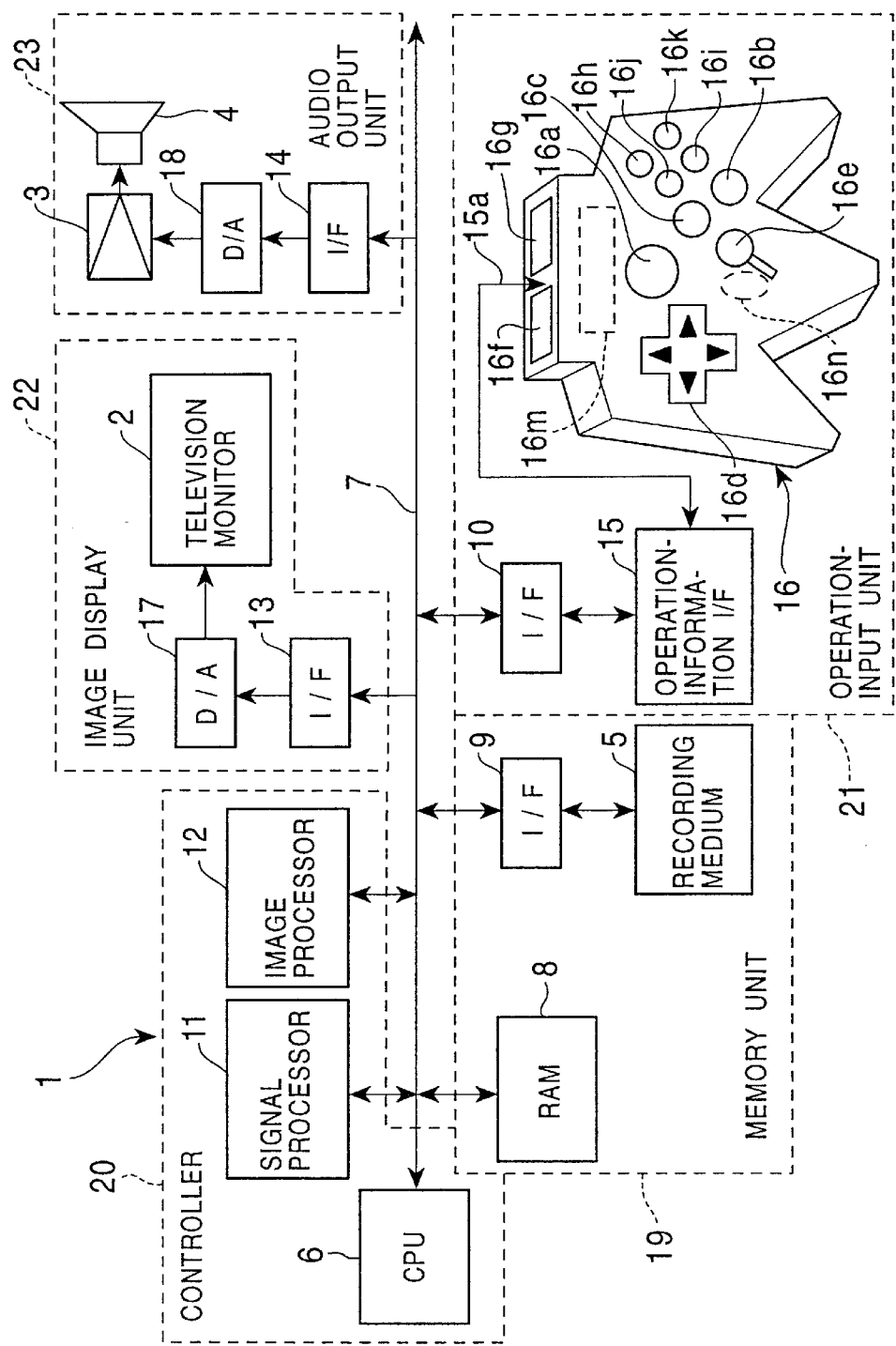
FIG. 1 is a block diagram showing a game system according to an embodiment of the present invention.

FIG. 1 shows the structure of a game system 1 according to an embodiment of the present invention.

The game system 1 includes a game machine, a television monitor 2 as a game-screen display unit for displaying game screens, an amplifying circuit 3 and a speaker 4 for outputting game sound, and a recording medium 5 containing game data composed of images, sound, and program data. The recording medium 5 is, for example, a so-called "read-only memory (ROM) cassette" in which a ROM, or the like, storing the game data and operating-system program data is accommodated in a plastic case, an optical disk, or a flexible disk.

In the game machine, a bus 7, including an address bus, a data bus, and a control bus, is connected to a CPU 6. A random-access memory (RAM) 8, an interface (I/F) circuit 9, an I/F circuit 10, a signal processor 11, an image processor 12, an I/F circuit 13, and an I/F circuit 14 are connected to the bus 7. A controller 16 is connected to the I/F circuit 10 via an operation-information I/F circuit 15. A digital-to-analog (D/A) converter 17 is connected to the I/F circuit 13, and a digital-to-analog (D/A) converter 18 is connected to the I/F circuit 14.

The RAM 8, the I/F circuit 9, and the recording medium 5 constitute a memory unit 19. The CPU 6, the signal processor 11, and the image processor 12 constitute a control unit 20. The I/F circuit 10, the operation-information I/F circuit 15, and the controller 16 constitute an operation-input unit 21. The monitor 2, the I/F circuit 13, and the D/A converter 17 constitute an image display unit 22. The amplifying circuit 3, the speaker 4, the I/F circuit 14, and the D/A converter 18 constitute an audio output unit 23.

The signal processor 11 mainly performs computation on a three-dimensional space, computation for converting a position in a three-dimensional space into a position in a virtual three-dimensional space, illumination computation, and the generation and processing of audio data.

The image processor 12 performs, based on the computation results obtained by the signal processor 11, the writing of image data to be rendered in the display area of the RAM 8. For example, the image processor 12 performs texture-data writing in an area of the RAM 8 which is designated by polygons. The texture-data writing is described below.

The controller 16 has a start button 16a, an A-button 16b, a B-button 16c, a cross key 16d, a stick control unit 16e, a left-trigger button 16f, a right-trigger button 16g, a C1-button 16h, a C2-button 16i, a C3-button 16j, a C4-button 16k, a connector 16m, and a distance-changing button 16n. The controller 16 sends, to the CPU 6, an operation signal in accordance with the operation of each button.

A memory card or the like for temporarily storing, for example, a game-progress status can be removably mounted in the connector 16m.

The stick control unit 16e is almost identical to a joystick in structure. The stick control unit 16e includes an upright stick that can be inclined around a predetermined position of the stick as a fulcrum in the directions of 360 degrees including the front, back, right, and left sides. In accordance with the inclined direction of the stick and an angle of inclination, an X coordinate in the horizontal direction and a Y coordinate in the vertical direction, obtained when the upright position is used as an origin, are sent to the CPU 6 via the I/F circuits 15 and 10.

The form of the game system differs depending on its purpose.

In other words, in the case where the game system is intended for home use, the monitor 2, the amplifying circuit 3, and the speaker 4 are provided separately from the game machine. In the case where the game system is intended for commercial use, all the components shown in FIG. 1 are integrated in a casing.

In the case where the game system 1 has a computer or workstation as a core, the monitor 2 corresponds to a display for the computer or workstation, the image processor 12 corresponds to part of the game program recorded on the recording medium 5, or the hardware of an add-in board mounted in an add-in slot of the computer or workstation, and the I/F circuits 9, 10, 13, and 14, the D/A converters 17 and 18, and the operation-information interface 15, correspond to the hardware of an add-in board mounted in an add-in slot of the computer or workstation. The RAM 8 corresponds to the areas of the main storage or expansion storage of the computer or workstation.

This embodiment shows the case where the game system 1 is intended for home use.

The operation of the game system 1 is briefly described below.

By turning on the main power switch (not shown) to supply power to the game system 1, the CPU 6 reads, based on the operating system recorded on the recording medium 5, images, sound, and game-program data from the recording medium 5. All or part of the read images, sound, and game-program data, are stored in the RAM 8.

Thereafter, the CPU 6 advances the game, based on the game-program data stored in the RAM 8 and on instructions designated from the controller 16 by the game player. In other words, the CPU 6 generates, based on instructions designated from the controller 16 by the game player, a command as a task for rendering and audio output, as required.

The signal processor 11 performs, based on the command, computation of a game character position in a three-dimensional space (similar to a two-dimensional space), illumination computation, and the generation and processing of the audio data.

Subsequently, based on the computation results, the image processor 12 writes, in the display area of the RAM 8, image data to be rendered. The image data written in the RAM 8 are supplied to the D/A converter 17 via the I/F circuit 13. The supplied data are converted into analog video signals before being supplied to the monitor 2. The signals are displayed as an image on the screen of the monitor 2.

Audio data output from the signal processor 11 are supplied to the D/A converter 18 via the I/F circuit 14. The supplied data are converted into analog audio signals, and are output as sound from the speaker 4 via the amplifying circuit 3.

The texture-data writing by the image processor 12 is described below with reference to FIG. 1.

As described above, the signal processor 11 performs computation, based on a command from the CPU 6. The image processor 12 writes, in the display area of the RAM 8, based on the computation results, image data to be rendered.

The RAM 8 has a non-display area and the display area (frame buffer). In the non-display area, data recorded on the recording medium 5, such as polygon data, texture-designating data (texture coordinates), and color data (texture data), are stored.

The polygons are objects set in the game space, in other words, two-dimensional virtual polygons constituting a model or character. In this embodiment, triangles and quadrangles are used. The texture is a two-dimensional image to be pasted on the polygons for forming an image. The color data are used to designate texture colors.

The polygon data as coordinate data on vertices constituting the polygons, and the texture-designating data designating textures for the polygons, are stored so as be combined.

Commands for rendering, generated by the CPU 6, includes a command for using polygons to render a stereoscopic image, and a command for rendering an ordinary two-dimensional image.

The command for using polygons to render a stereoscopic image includes polygon-vertex-address data in the non-display area of the RAM 8, texture-address data representing the locations of the RAM 8 at which the texture data are stored, color-address data representing the locations in the display area of the RAM 8 at which color data representing the colors of the textures are stored, and brightness data representing texture brightness.

Among these data, the polygon-vertex-address data in the non-display area of the RAM 8 are transformed into two-dimensional polygon-vertex-coordinate data such that the signal processor 11 performs, based on translation-amount data and rotation-amount data on the screen itself (viewpoint), coordinate transformation and perspective projection transformation on the polygon-vertex-coordinate data in the three-dimensional space from the CPU 6.

The two-dimensional polygon-vertex-coordinate data represent addresses in the display area of the RAM 8. The image processor 12 writes, in the range of the display area of the RAM 8 which is designated by three or four polygon-vertex-coordinate data, texture data designated by preassigned texture-address data. This causes the display screen of the monitor 2 to display an object formed by pasting a texture on each polygon.

Figure 2:
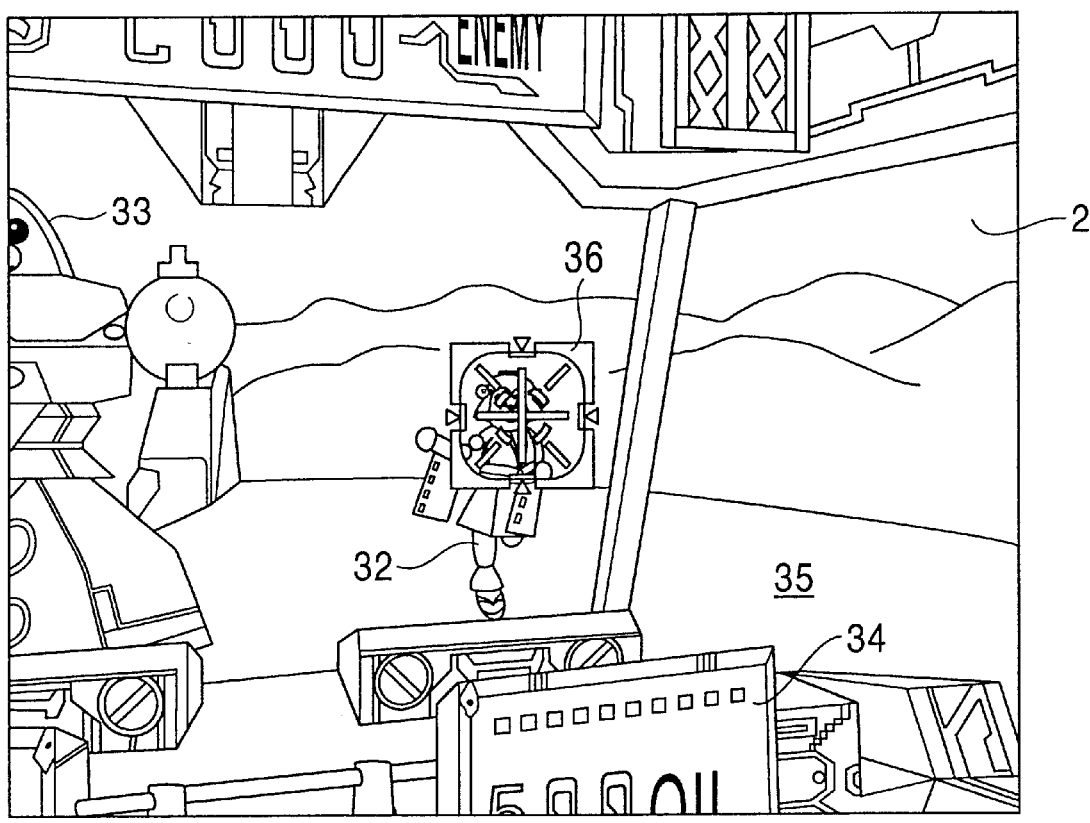
FIG. 2 is an illustration of a game screen of a video game.

With reference to FIG. 2, an outline of the video game executed by the game system 1 is described below. FIG. 2 shows a video game screen as a view from a first leading character 31 (depicted in FIG. 10).

The video game is designed to be simultaneously played by two players. To play the video game, the game system 1 (shown in FIG. 1) is provided with two controllers 16 (shown in FIG. 1) having the same structure, which are operated by the first and second players. In a game space (virtual three-dimensional space), the first leading character 31 manipulated by an operation signal from a first controller 161 (shown in FIG. 3), and a second leading character 32 manipulated by an operation signal from a second controller 162 (shown in FIG. 3), cooperatively fight against an enemy boss character 33, as shown in FIG. 2.

In the video game, cockpits are provided for the leading characters 31 and 32. Normally, the game screen is displayed on the monitor 2, with a viewpoint disposed at a predetermined position (a pair of coordinates) in one cockpit. In FIG. 2, a view obtained from a viewpoint provided in the cockpit 34 for the first leading character 31 is displayed, and the second leading character 32 is displayed in a field 35. In FIG. 2, a scope 36 is also displayed near the center of the monitor 2. The scope 36 indicates a viewing direction (line of sight) from the viewpoint, and denotes an attack target or a target for baton darting.

In this video game, one player who operates a controller 16 for manipulating a leading character on the side of the cockpit, in which the viewpoint for the game screen is provided, controls the game. In many cases, the leading character on the cockpit side fights against the enemy boss character 33. Damage to the leading character on the cockpit side by the enemy boss character 33 reduces its life value. When the life value is reduced to zero, the game is terminated.

In addition, the other player operates the other controller 16 for manipulating the leading character on the field side, whereby the leading character on the field side can, to some extent, attack the enemy boss character 33. However, the leading character on the field side is designed so that its life value cannot be reduced if it is attacked by the enemy boss character 33.

Accordingly, in order that each player may similarly enjoy the game, the viewpoint used when the game screen is displayed on the monitor 2 can be switched between a pair of coordinates in the cockpit 34 for the first leading character 31 and a pair of coordinates in a cockpit 37 (shown in FIG. 10) for the second leading character 32.

Figure 3:
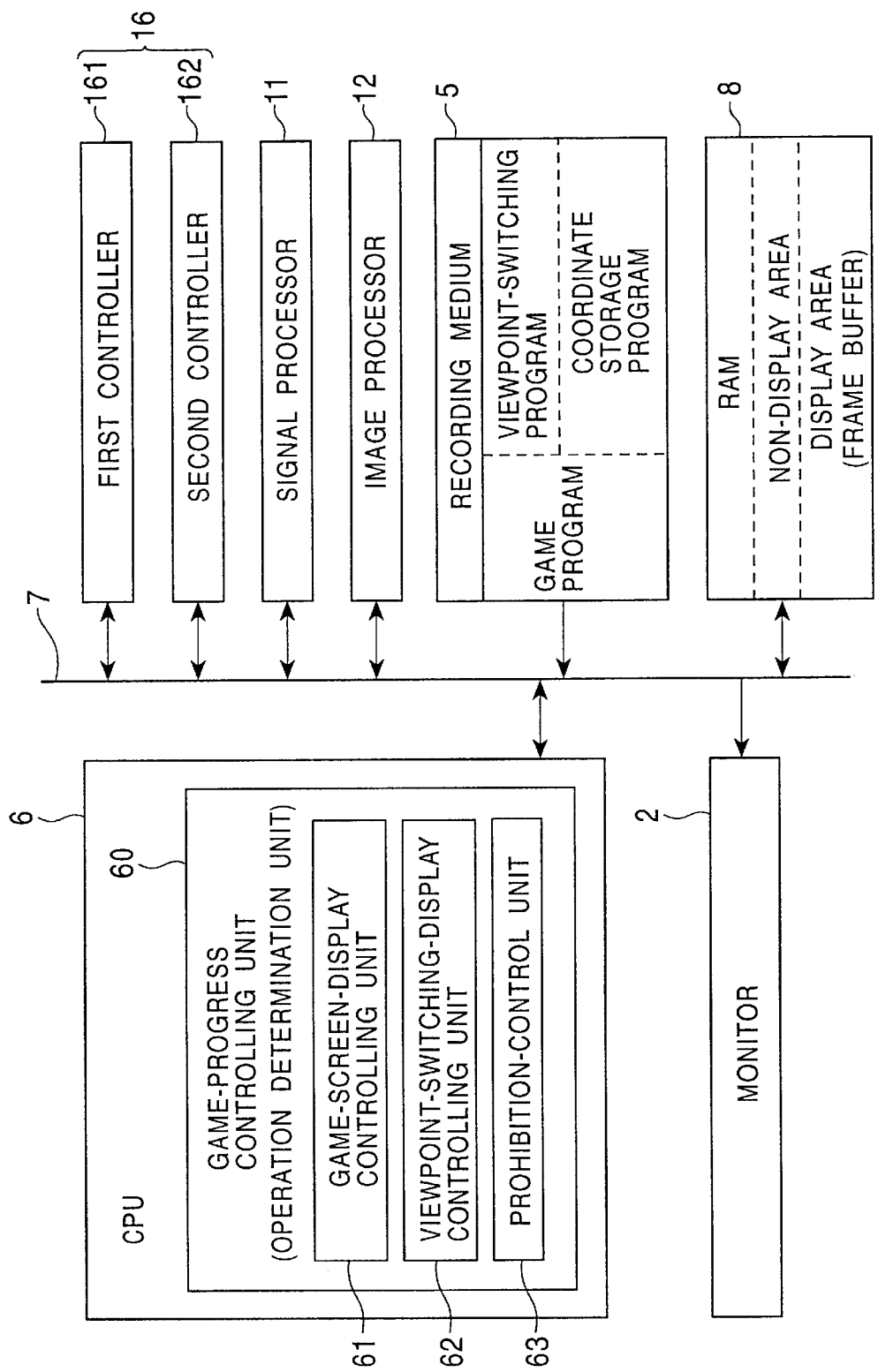
FIG. 3 is a drawing composed of a functional block diagram showing the CPU 6 shown in FIG. 1 and a block diagram showing the main components shown in FIG. 1.
Figure 4:
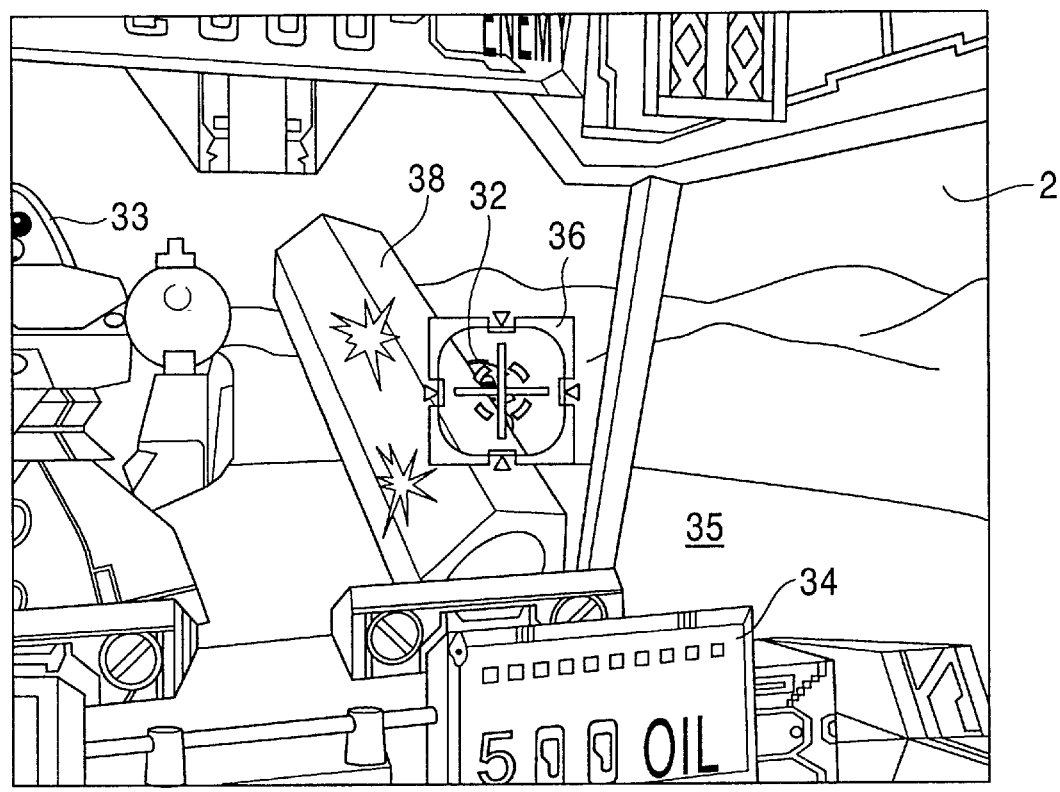
FIG. 4 is an illustration of a game screen of a video game.

FIG. 3 shows the functional blocks of the CPU 6 and the main components of the game system 1. FIG. 4 shows a video game screen.

On the recording medium 5, the program of the video game briefly described above is recorded. Specifically, a pair of coordinates related to the first leading character 31 (i.e., an appropriate position in the cockpit 34 in this embodiment), and a pair of coordinates related to the second leading character 32 (i.e., an appropriate position in the corresponding cockpit in this embodiment) are stored beforehand as part of the game program, and a viewpoint-switching program for switching the viewpoint between the pairs of coordinates is stored.

As described above, the game system 1 includes, as the controllers 16, the first and second controllers 161 and 162 having the same structure. When the first and second controllers 161 and 162 do not need to be distinguished in function from each other in the description, they are generically referred to as the "controller 16" or "controllers 16".

The CPU 6 includes a game-progress controlling unit 60 as the main functional block.

The game-progress controlling unit 60 determines which leading character operates the controller 16, based on an operation signal sent from the controller 16 in accordance with the game program recorded on the recording medium 5, and controls the operation of each block shown in FIG. 1 in accordance with the operation.

For example, if it is determined that the controller 16 corresponds to the leading character on the cockpit side or the viewpoint side, the leading character on the viewpoint side is displayed while being controlled to perform the following actions:
(1) by operating the stick control unit 16e, the position of the scope 36 (shown in FIG. 2), i.e., the direction of the cockpit 34 to the field is moved. This changes the sight direction from the viewpoint;
(2) by operating the A-button 16b, the leading character on the viewpoint side is manipulated to perform the action of a right straight punch;
(3) by operating the B-button 16c, the leading character on the viewpoint side is manipulated to perform the action of a left jab; and
(4) by simultaneously operating the A-button 16b and the B-button 16c, the leading character on the viewpoint side is manipulated to defend itself from an attack by the enemy boss character 33 by covering its front with its arms.

If it is determined that the controller 16 corresponds to the leading character on the field side, i.e., on the non-viewpoint side, the leading character on the field side is displayed while being controlled to perform the following actions:
(1) by operating the stick control unit 16e, the leading character on the field side is moved on the field 35 (shown in FIG. 2);
(2) by operating the A-button 16b, the leading character on the field side is manipulated to perform the action of a jump; and
(3) by operating the B-button 16c, the leading character on the field side is manipulated to perform the action of an attack.

The game-progress controlling unit 60 has, as an operation-determination unit, the functions of:
(1) determining whether the right-trigger button 16g of the controller 16 corresponding to the leading character on the cockpit side has been operated (viewpoint switching);
(2) determining whether the scope 36 is set on the leading character on the field side when the right-trigger button 16g of the controller 16 corresponding to the leading character on the cockpit side has been operated, in other words, when a viewpoint-switching operation has been implemented; and
(3) determining whether the leading character on the field side is manipulated, when a baton 38 (described below) shown in FIG. 4 is displayed on the monitor 2, to perform a viewpoint-switching rejecting movement such as a baton-avoiding movement including a jump of the leading character on the field side, which is performed by operating the A-button 16b of the controller 16, and an attack-by-baton movement performed by operating the B-button 16c.

When a viewpoint-switching rejection is not performed and the position at which the button 38 is displayed falls in a predetermined range including the leading character on the field side, the game-progress controlling unit 60 determines that no viewpoint-switching rejecting operation has been implemented.

The game-progress controlling unit 60 further includes a game-screen-display control unit 61, a viewpoint-switching-display controlling unit 62, and a prohibition-control unit 63.

The game-screen-display control unit 61 displays the game screen on the monitor 2, using, as a viewpoint, either a pair of in-cockpit coordinates related to the first leading character 31 or a pair of in-cockpit coordinates related to the second leading character 32.

The viewpoint-switching-display controlling unit 62 has the following functions:

(1) a function in which if the game-progress controlling unit 60 has determined that the right-trigger button 16g of the controller 16 has been operated, in other words, a viewpoint-switching operation has been implemented, the function displays the baton 38 (viewpoint-switching item) on the monitor 2, as shown in FIG. 4, and moves the baton 38 in the direction of the scope 36, for example, toward the leading character on the field side before initiating a viewpoint-switching movement;

(2) a function in which if the game-progress controlling unit 60 has determined that the viewpoint-switching rejecting operation has been performed, the function interrupts the viewpoint-switching movement and terminates the display of the baton 38;

(3) a function in which if the game-progress controlling unit 60 has determined that no viewpoint-switching rejecting operation has been implemented, the function uses a process (described below) to switch the viewpoint of the game screen displayed on the monitor 2 to a pair of in-cockpit coordinates related to the leading character on the field side, and terminates the display of the baton 38; and (4) a function in which when the scope 36 is not set on the leading character on the field side at the time of determining that the viewpoint-switching operation has been implemented, the function causes the baton 38 to reach a position far from the leading character on the field side toward the scope 36, and interrupts the viewpoint-switching movement to terminate the display of the baton 38.

The prohibition-control unit 63 has a function in which while the baton 38 is being displayed on the monitor 2, the function prohibits the game-progress controlling unit 60 from determining whether the right-trigger button 16g of the controller 16 corresponding to the leading character on the cockpit side has been operated (whether viewpoint-switching operation has been implemented).

Figure 9:
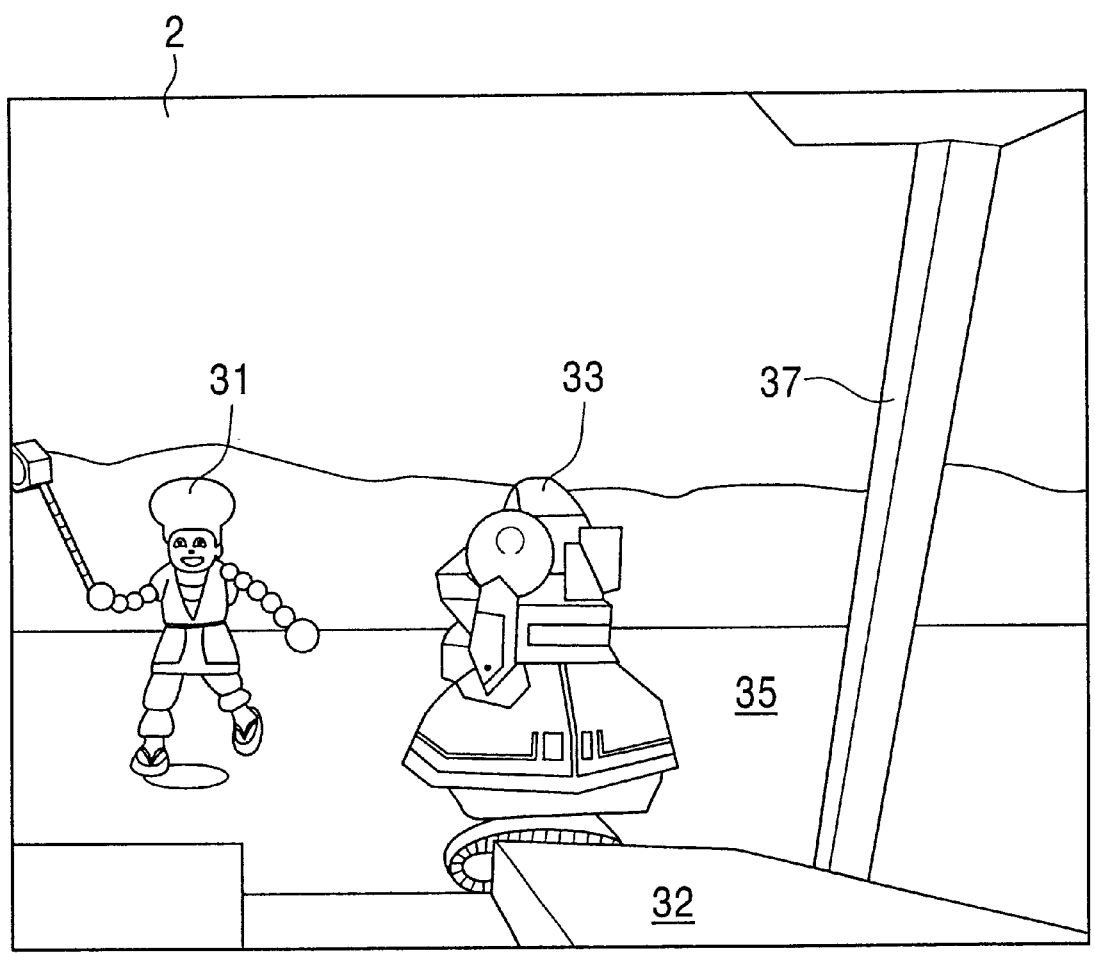
FIG. 9 is an illustration of a game screen of a video game.
Figure 10:
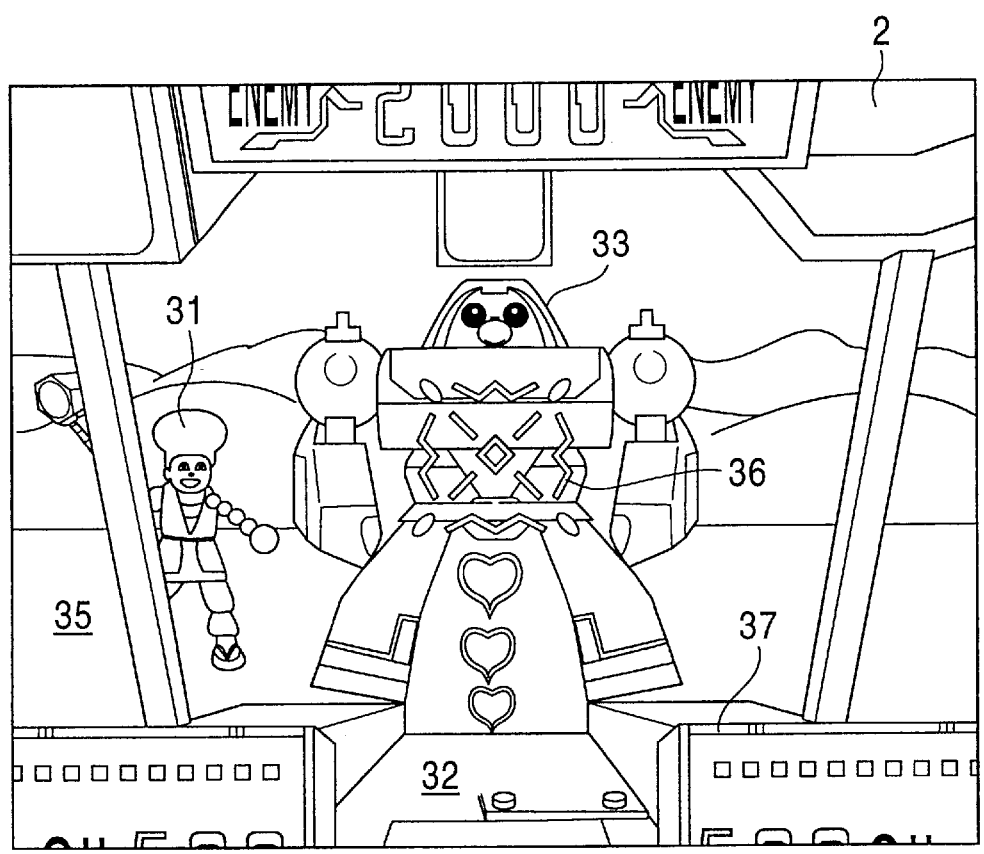
FIG. 10 is an illustration of a game screen of a video game.
Figure 11:
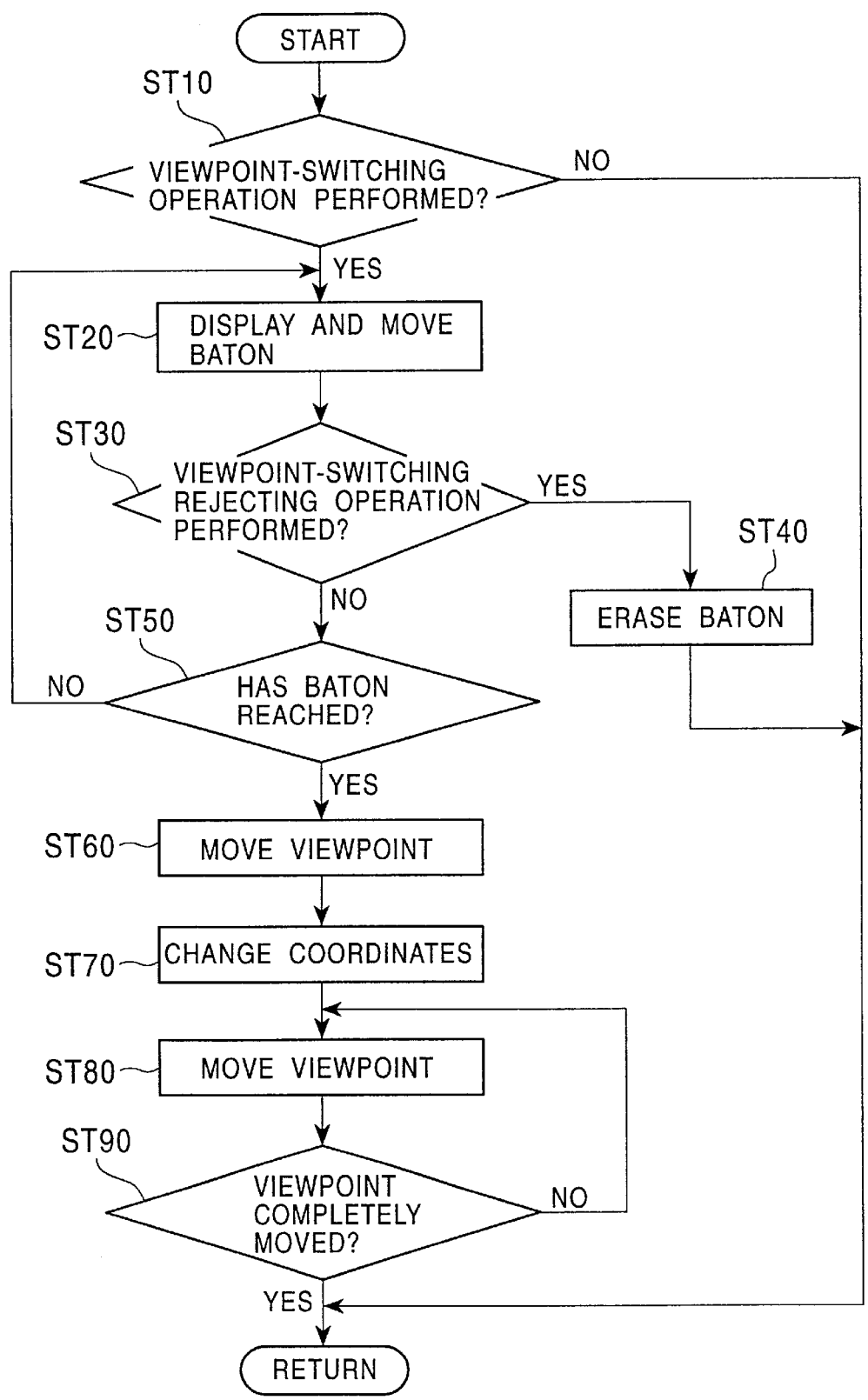
FIG. 11 is a flowchart showing the operation process of a viewpoint-switching program.

With reference to FIGS. 4 to 10, the operation process of the viewpoint-switching program is described below in accordance with the flowchart shown in FIG. 11.

The process determines whether the right-trigger button 16g of the controller 16 corresponding to the first leading character 31 on the cockpit side has been operated, in other words, whether the viewpoint-switching operation has been implemented (step ST10). If the process has determined negatively ("NO" in step ST10), the process is terminated.

Figure 5:
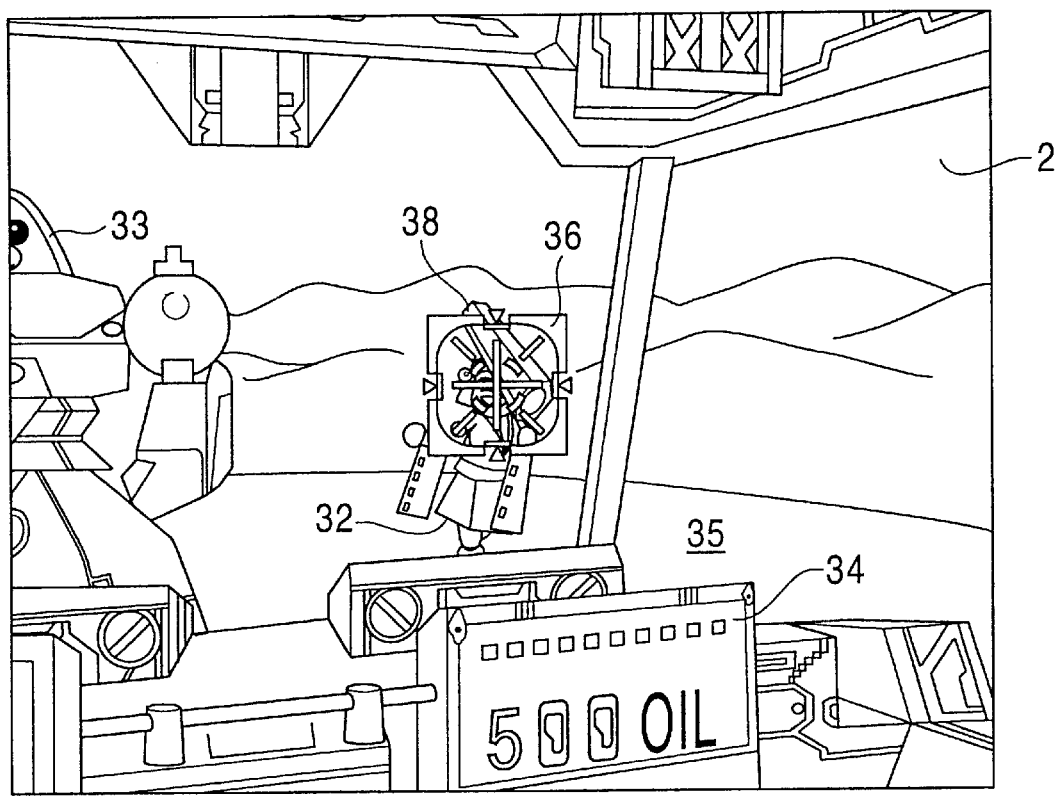
FIG. 5 is an illustration of a game screen of a video game.

If the viewpoint-switching operation has been implemented ("YES" in ST10), the baton 38 is displayed as shown in FIG. 4, and is moved to the scope 36, as shown in FIG. 5 (step ST20). The process determines whether a viewpoint-switching rejecting operation has been implemented (step ST30). If the viewpoint-switching rejecting operation has been implemented ("YES" in step ST30), the baton 38 is erased on the monitor 2 (step ST40), and the process is terminated.

If the viewpoint-switching rejecting operation has not been implemented ("NO" in step ST30), the process determines whether the baton 38 reaches the second leading character 32 on the field side (step ST50). Until the baton 38 reaches the second leading character 32 ("NO" in step ST50), steps ST20 to ST50 are repeatedly performed.

Figure 6:
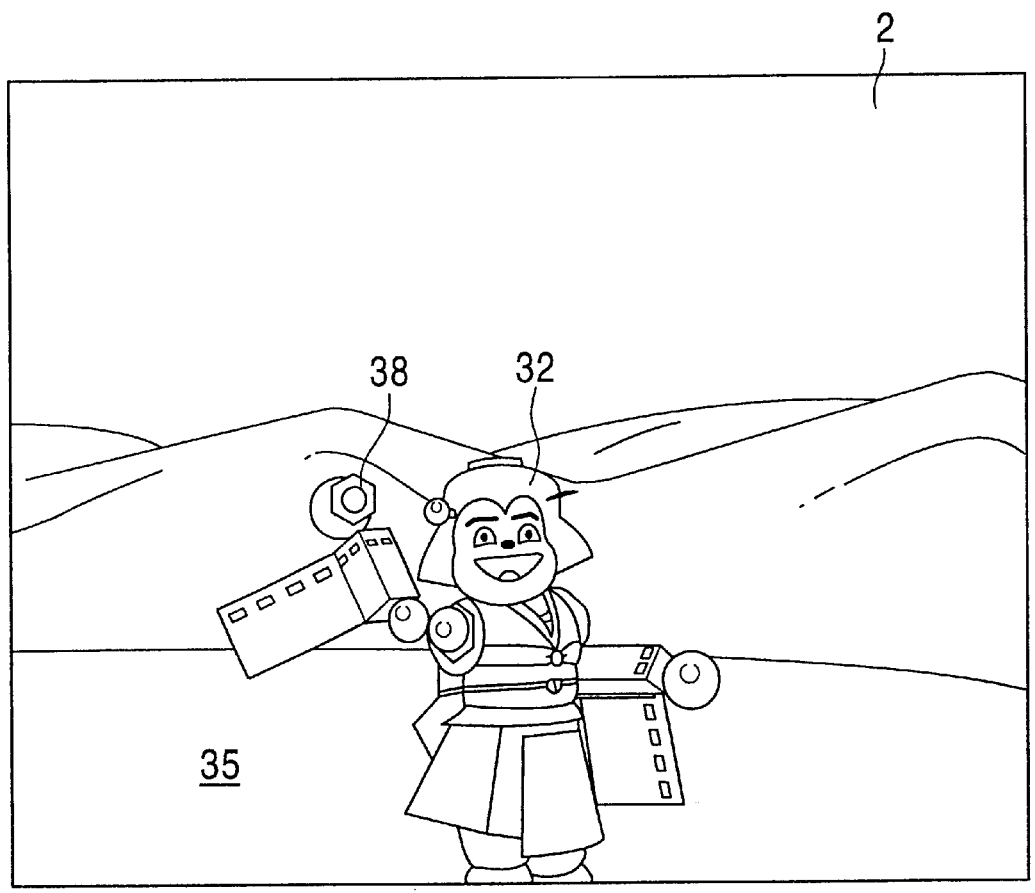
FIG. 6 is an illustration of a game screen of a video game.
Figure 7:
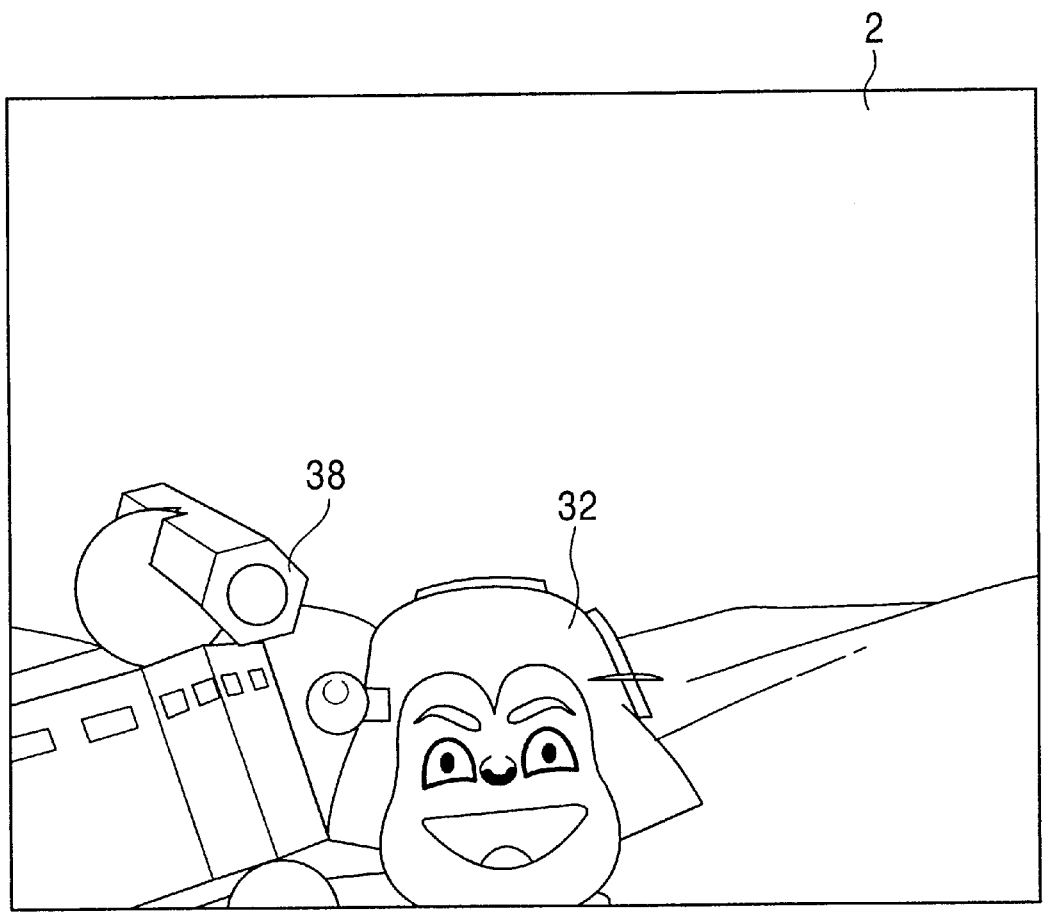
FIG. 7 is an illustration of a game screen of a video game.

If the baton 38 has reaches the second leading character 32 on the field side ("YES" in step ST50), the viewpoint is rapidly moved from a pair of in-cockpit coordinates to above the second leading character 32 (step ST60), and the pairs of relative coordinates of the first leading character 31 on the cockpit side and the second leading character 32 on the field side are switched from each other, while the pair of coordinates of the enemy boss character 33 is changed so as to be adapted for the position of the second leading character 32 (step ST70), as shown in FIGS. 6 and 7.

Figure 8:
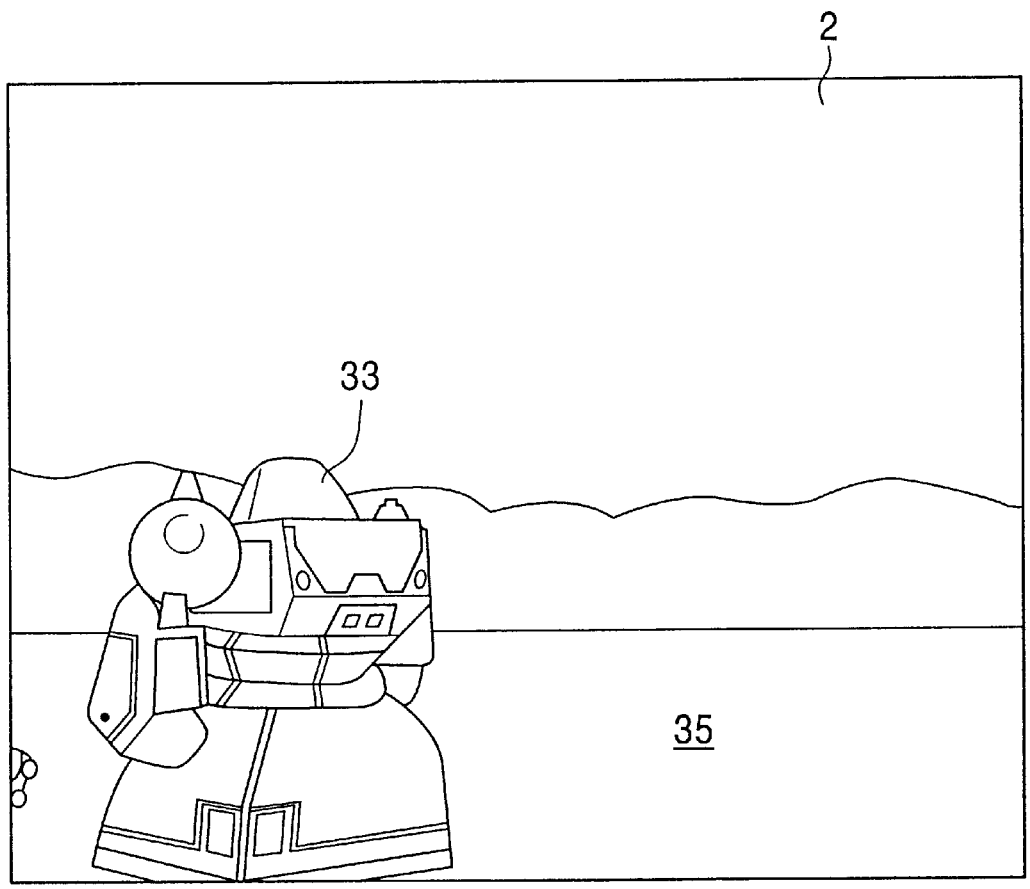
FIG. 8 is an illustration of a game screen of a video game.

Subsequently, the viewpoint is rapidly moved toward the inside of the cockpit for the second leading character 32 (step ST80), as shown in FIGS. 8 and 9. Since the coordinates have been changed at this time, the first leading character 31 and the enemy boss character 33 are displayed in the field 35, as shown in FIGS. 8 and 9. Also, the enemy boss character 33 is trying to turn from the posture that its back can be seen to the second leading character 32 on the cockpit side.

The process determines whether the viewpoint movement is completed (step ST90). Until the viewpoint movement is completed ("NO" in step ST90), the viewpoint movement is continuously performed. When the viewpoint is positioned at a pair of coordinates in the cockpit for the second leading character, as shown in FIG. 10, the viewpoint switching movement is completed ("YES" in step ST90) to terminate the process.

As described above, according to this embodiment, by determining whether the right-trigger button 16g of the controller 16 corresponding to the leading character on the cockpit side as the viewpoint side on the game screen has been operated (whether a viewpoint-switching operation has been implemented), and initiating a viewpoint-switching movement when it is determined that the viewpoint-switching operation has been implemented, the viewpoint switching enables each player operating the controller 16 corresponding to each leading character to clearly grasp the relationship between the operation of the controller 16 and the movement of each leading character.

By displaying the baton 38 on the monitor 2, and initiating a viewpoint-switching movement, the player manipulating each leading character can be clearly informed of a status in which the viewpoint is being switched.

While the baton 38 is being displayed, by prohibiting the determination of whether the viewpoint-switching operation has been implemented, successive or frequent implementation of the viewpoint-switching movement prevents an unclear game screen from being displayed. Accordingly, a viewpoint for the game screen displayed on the monitor 2 can be preferably switched among pairs of coordinates provided in the cockpit for each leading character.

By moving the baton 38 toward the leading character on the field side, and moving the viewpoint when the baton 38 reaches another leading character, a predetermined time can be held as a time required for the viewpoint-switching movement, and this securely prevents the viewpoint-switching movement from being successively or frequently performed.

By determining whether a viewpoint-switching rejecting operation to the controller 16 corresponding to the leading character on the field side, and interrupting the viewpoint-switching operation when the viewpoint-switching rejecting operation has been implemented, the player operating the controller 16 corresponding to the leading character on the field side can select acceptance or rejection on the viewpoint switching. This increases the diversity of the video game, and enhances the enjoyment of the game.

In the case where it is determined that no viewpoint-switching operation has been performed, by moving the viewpoint to approach the leading character on the field side before switching the viewpoint coordinates to coordinates in the cockpit for the leading character, the viewpoint switching can be dynamically expressed, compared with the case where the viewpoint is simply switched in an instant.

The present invention is not limited to the foregoing embodiments, but may be variously modified as follows:

(1) Although the baton 38 is displayed in the foregoing embodiments, the viewpoint-switching movement may be initiated such that each leading character is moved to touch another leading character;

(2) Although the baton 38 is used as a viewpoint-switching item in the foregoing embodiments, an expressing form in which the viewpoint-switching movement is clearly displayed may be employed; and (3) Although the video game in the foregoing embodiments is simultaneously executed by two players, the video game may be designed to be executed by at least three players. In this case, the game system 1 may be constructed so as to be connected to the number of controllers 16 which is equal to the number of players. The game-progress controlling unit 60 may have a function of determining the leading character on the field side which is specified by the scope 36 when having determined that a viewpoint-switching operation has been implemented, and may determine whether a viewpoint-switching rejecting operation has been implemented in the operation of the controller 16 corresponding to the determined leading character.

What is claimed is:

1. A video game machine comprising:

a plurality of operation means corresponding to a plurality of leading characters including at least a first leading character and a second leading character appearing in a virtual three-dimensional space, the operation means causing the corresponding leading characters to move;

a game-screen display;

coordinate storage means for storing coordinate sets including at least a first coordinate set and a second coordinate set such that said first coordinate set is particularly associated with said first leading character and said second coordinate set is particularly associated with said second leading character, a first viewpoint being set in said first coordinate set and a second viewpoint being set in said second coordinate set;

game-screen display-control means for displaying a game screen obtained by using any one of said first and second coordinate sets as a viewpoint on said game-screen display;

operation-determining means for determining whether a viewpoint-switching operation has been implemented among operations using one operation means for moving said first leading character associated with said first viewpoint in said first coordinate set in the game screen displayed on said game-screen display; and viewpoint-switching-display control means for initiating a viewpoint-switching movement of switching said first viewpoint in said first coordinate set to the second viewpoint in said second coordinate set when said operation-determining means has determined that the viewpoint-switching operation has been implemented.

2. A video game machine according to claim 1, wherein when said operation-determining means has determined that the viewpoint-switching operation has been implemented, said viewpoint-switching-display control means displays a viewpoint-switching item as an indicator of initiation of the viewpoint-switching movement.

3. A video game machine according to claim 2, further comprising prohibition-control means for prohibiting said operation-determining means from determining whether the viewpoint-switching operation has been implemented while said viewpoint-switching item is being displayed.

4. A video game machine according to claim 3, wherein said operation-determining means determines a specified leading character of said plurality of leading characters specified by the viewpoint-switching operation from among other of said plurality of leading characters displayed on said game-screen display.

5. A video game machine according to claim 4, wherein:

said operation-determining means further determines whether a viewpoint-switching rejecting operation has been implemented among operations using one operation means corresponding to the specified leading character; and when said operation-determining means has determined that the viewpoint-switching rejecting operation has been implemented, said viewpoint-switching-display control means interrupts the viewpoint-switching movement and terminates the display of said viewpoint-switching item, while when said operation-determining means has determined that no viewpoint-switching rejecting operation has been implemented, said viewpoint-switching-display control means switches the coordinate set of the viewpoint to another coordinate set so as to be related to another leading character, and terminates the display of said viewpoint-switching item.

6. A video game machine according to claim 5, wherein:

said viewpoint-switching-display control means moves the viewpoint-switching item being displayed toward the specified leading character; and when the operation means corresponding to the specified leading character is operated for one of attacking and avoiding said viewpoint-switching item, said operation-determining means determines that the viewpoint-switching rejecting operation has been implemented.

7. A video game machine according to claim 6, wherein when it is determined that the viewpoint-switching rejecting operation has not been implemented, said viewpoint-switching-display control means moves the viewpoint to approach the specified leading character before switching the viewpoint to a coordinate set related to the specified leading character.

8. A video game machine according to claim 5, wherein:

said viewpoint-switching-display control means moves the viewpoint-switching item being displayed toward the specified leading character; and when the operation means corresponding to the specified leading character is not operated for one of attacking and avoiding the viewpoint-switching item, and the viewpoint-switching item reaches a predetermined range including the specified leading character, said operation-determining means determines that the viewpoint-switching rejecting operation has not been implemented.

9. A video game machine according to claim 8, wherein when it is determined that the viewpoint-switching rejecting operation has not been implemented, said viewpoint-switching-display control means moves the viewpoint to approach the specified leading character before switching the viewpoint to a coordinate set related to the specified leading character.

10. A video game machine according to claim 5, wherein when it is determined that the viewpoint-switching rejecting operation has not been implemented, said viewpoint-switching-display control means moves the viewpoint to approach the specified leading character before switching the viewpoint to a coordinate set related to the specified leading character.

11. A video game machine according to claim 2, wherein said operation-determining means determines a specified leading character of said plurality of leading characters specified by the viewpoint-switching operation from among other of said plurality of leading characters displayed on said game-screen display.

12. A video game machine according to claim 11, wherein:
   said operation-determining means further determines whether a viewpoint-switching rejecting operation has been implemented among operations using one operation means corresponding to the specified leading character; and
   when said operation-determining means has determined that the viewpoint-switching rejecting operation has been implemented, said viewpoint-switching-display control means interrupts the viewpoint-switching movement and terminates the display of said viewpoint-switching item, while when said operation-determining means has determined that no viewpoint-switching rejecting operation has been implemented, said viewpoint-switching-display control means switches the coordinate set of the viewpoint to another coordinate set so as to be related to another leading character, and terminates the display of said viewpoint-switching item.

13. A video game machine according to claim 12, wherein:
   said viewpoint-switching-display control means moves the viewpoint-switching item being displayed toward the specified leading character; and
   when the operation means corresponding to the specified leading character is operated for one of attacking and avoiding said viewpoint-switching item, said operation-determining means determines that the viewpoint-switching rejecting operation has been implemented.

14. A video game machine according to claim 13, wherein when it is determined that the viewpoint-switching rejecting operation has not been implemented, said viewpoint-switching-display control means moves the viewpoint to approach the specified leading character before switching the viewpoint to a coordinate set related to the specified leading character.

15. A video game machine according to claim 12, wherein:
   said viewpoint-switching-display control means moves the viewpoint-switching item being displayed toward the specified leading character; and
   when the operation means corresponding to the specified leading character is not operated for one of attacking and avoiding the viewpoint-switching item, and the viewpoint-switching item reaches a predetermined range including the specified leading character, said-operation-determining means determines that the viewpoint-switching rejecting operation has not been implemented.

16. A video game machine according to claim 15, wherein when it is determined that the viewpoint-switching rejecting operation has not been implemented, said viewpoint-switching-display control means moves the viewpoint to approach the specified leading character before switching the viewpoint to a coordinate set related to the specified leading character.

17. A video game machine according to claim 12, wherein when it is determined that the viewpoint-switching rejecting operation has not been implemented, said viewpoint-switching-display control means moves the viewpoint to approach the specified leading character before switching the viewpoint to a coordinate set related to the specified leading character.

18. A video game machine according to claim 1, wherein said operation-determining means determines a specified leading character of said plurality of leading characters specified by the viewpoint-switching operation from among other of said plurality of leading characters displayed on said game-screen display.

19. A video game machine according to claim 18, wherein:
   said operation-determining means further determines whether a viewpoint-switching rejecting operation has been implemented among operations using one operation means corresponding to the specified leading character; and
   when said operation-determining means has determined that the viewpoint-switching rejecting operation has been implemented, said viewpoint-switching-display control means interrupts the viewpoint-switching movement and terminates the display of said viewpoint-switching item, while when said operation-determining means has determined that no viewpoint-switching rejecting operation has been implemented, said viewpoint-switching-display control means switches the coordinate set of the viewpoint to another coordinate set so as to be related to another leading character, and terminates the display of said viewpoint-switching item.

20. A video game machine according to claim 19, wherein:
   said viewpoint-switching-display control means moves the viewpoint-switching item being displayed toward the specified leading character; and
   when the operation means corresponding to the specified leading character is operated for one of attacking and avoiding said viewpoint-switching item, said operation-determining means determines that the viewpoint-switching rejecting operation has been implemented.

21. A video game machine according to claim 20, wherein when it is determined that the viewpoint-switching rejecting operation has not been implemented, said viewpoint-switching-display control means moves the viewpoint to approach the specified leading character before switching the viewpoint to a coordinate set related to the specified leading character.

22. A video game machine according to claim 19, wherein:
   said viewpoint-switching-display control means moves the viewpoint-switching item being displayed toward the specified leading character; and
   when the operation means corresponding to the specified leading character is not operated for one of attacking and avoiding the viewpoint-switching item, and the viewpoint-switching item reaches a predetermined range including the specified leading character, said operation-determining means determines that the viewpoint-switching rejecting operation has not been implemented.

23. A video game machine according to claim 22, wherein when it is determined that the viewpoint-switching rejecting operation has not been implemented, said viewpoint-switching-display control means moves the viewpoint to approach the specified leading character before switching the viewpoint to a coordinate set related to the specified leading character.

24. A video game machine according to claim 19, wherein when it is determined that the viewpoint-switching rejecting operation has not been implemented, said viewpoint-switching-display control means moves the viewpoint to approach the specified leading character before switching the viewpoint to a coordinate set related to the specified leading character.

25. A method for switching a game-screen viewpoint used in a video game, comprising the steps of:

displaying a game screen on which a plurality of leading characters including at least a first leading character and a second leading character appear in a virtual three-dimensional space;

moving said at least first and second leading characters by using operation means corresponding to the leading characters;

associating a first coordinate set with said first leading character and a second coordinate set with said second leading character;

setting a first viewpoint in said first coordinate set and a second viewpoint in said second coordinate set;

determining whether a viewpoint-switching operation has been implemented by using one of the operation means so that said first leading character associated with said first viewpoint in said first coordinate set for the game screen is moved; and initiating a viewpoint-switching movement for switching said first viewpoint in said first coordinate set to the second viewpoint in said second coordinate set when it is determined that the viewpoint-switching operation has been implemented.

26. A computer-readable recording medium containing a game-screen-viewpoint switching program for a video game comprising executable code for execution by a computer processor causing said processor to perform the steps of:

displaying a game screen on which a plurality of leading characters including at least a first leading character and a second leading character appearing in a virtual three-dimensional space;

moving said at least first and second leading characters by operation means corresponding to the leading characters;

associating a first coordinate set with said first leading character and a second coordinate set with said second leading character;

setting a first viewpoint in said first coordinate set and a second viewpoint in said second coordinate set;

determining whether a viewpoint-switching operation has been implemented by using one of the operation means so that said first leading character associated with said first viewpoint in said first coordinate set for the game screen is moved; and initiating a viewpoint-switching movement for switching said first viewpoint in said first coordinate set to the second viewpoint in said second coordinate set when it is determined that the viewpoint-switching operation has been implemented.

* * * * *